US012039222B2

(12) United States Patent
Ikeuchi et al.

(10) Patent No.: US 12,039,222 B2
(45) Date of Patent: Jul. 16, 2024

(54) CONTROL METHOD, CONTROLLER, AND RECORDING MEDIUM

(71) Applicant: Panasonic Intellectual Property Management Co., Ltd., Osaka (JP)

(72) Inventors: Hiromu Ikeuchi, Hyogo (JP); Yoshiki Ohashi, Osaka (JP); Satoru Matsunaga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 149 days.

(21) Appl. No.: 17/776,557

(22) PCT Filed: Jun. 30, 2021

(86) PCT No.: PCT/JP2021/024664
§ 371 (c)(1),
(2) Date: May 12, 2022

(87) PCT Pub. No.: WO2022/215279
PCT Pub. Date: Oct. 13, 2022

(65) Prior Publication Data
US 2023/0333805 A1 Oct. 19, 2023

(30) Foreign Application Priority Data
Apr. 8, 2021 (JP) ................. 2021-066033

(51) Int. Cl.
G06F 3/16 (2006.01)
G10L 13/027 (2013.01)
(52) U.S. Cl.
CPC .............. G06F 3/16 (2013.01); G10L 13/027 (2013.01)

(58) Field of Classification Search
CPC ....... G10L 13/027; G10L 13/02; G10L 13/00; G10L 13/043; G06F 3/167; G06F 3/16; G06F 3/162; G06F 3/165; G06F 16/9038
(Continued)

(56) References Cited

U.S. PATENT DOCUMENTS

2014/0277645 A1* 9/2014 Thirumale ......... G01C 21/3629
700/94
2016/0225367 A1* 8/2016 Sugiyama .......... G01C 21/3661
(Continued)

FOREIGN PATENT DOCUMENTS

JP 2009-265278 A 11/2009
JP 2015-164251 A 9/2015
(Continued)

OTHER PUBLICATIONS

Japanese Office Action mailed on Mar. 7, 2023 for the corresponding Japanese Patent Application No. 2021-576423 with English translation.
(Continued)

Primary Examiner — Yogeshkumar Patel
(74) Attorney, Agent, or Firm — Rimon P.C.

(57) ABSTRACT

A control method includes obtaining an information item on operation of a first device from the first device, determining a priority level for the obtained information item according to the content or attribute of the obtained information item, storing the obtained information item in a memory unit in association with the determined priority level, and preferentially transmitting an information item associated with a higher priority level among information items stored in the memory unit to a second device to cause the second device to output the information item associated with the higher priority level by sound, the information items having been obtained in the obtaining.

11 Claims, 8 Drawing Sheets

(58) Field of Classification Search
USPC .......................................................... 700/94
See application file for complete search history.

(56) References Cited

U.S. PATENT DOCUMENTS

2019/0088099 A1* 3/2019 Garg ...................... H04R 29/00
2020/0125398 A1* 4/2020 Araki ................... G06Q 10/101

FOREIGN PATENT DOCUMENTS

| JP | 2015-225258 A | 12/2015 | | |
|----|---------------|---------|---|---|
| JP | 2016-081009 A | 5/2016 | | |
| JP | 2016-134038 A | 7/2016 | | |
| JP | 2016134038 A * | 7/2016 | | |
| JP | 2016-224393 A | 12/2016 | | |
| JP | 2016224393 A * | 12/2016 | | |
| JP | 2017-069836 A | 4/2017 | | |
| JP | 6509701 B | 4/2017 | | |
| WO | WO-2018165470 A1 * | 9/2018 | ............. | G06F 3/016 |

OTHER PUBLICATIONS

International Search Report dated Aug. 24, 2021 issued in International Patent Application No. PCT/JP2021/024664.

* cited by examiner

| Number | Type | Details |
|---|---|---|
| #1 | Error | Door is not locked. |
| #2 | Error | Water cannot be drained. |
| ... | ... | ... |
| #11 | Notice | Laundry is complete. |
| ... | ... | ... |

| Transmission source device | User |
|---|---|
| Device 21 | User U |
| Device 22 | User V |

| User | Device that outputs sound |
|---|---|
| User U | Device 31 |
| User V | Device 32 |

| User | Device that outputs sound |
|---|---|
| User U | Device 31 |
| User V | Devices 31 and 32 |

FIG. 13
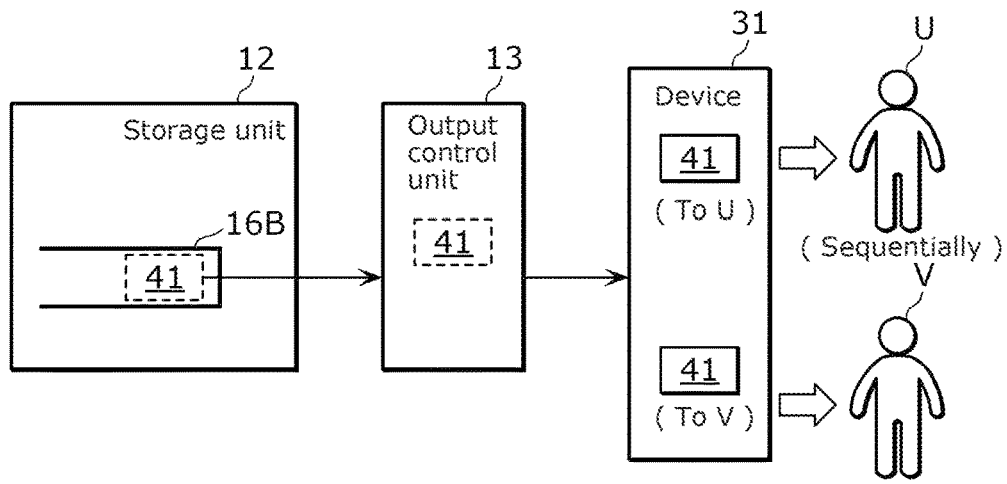
FIG. 14
| Transmission source device | User |
|---|---|
| Device 21 | Users U and V |
FIG. 15
| User | Device that outputs sound |
|---|---|
| User U | Device 31 |
| User V | Device 31 |
FIG. 16
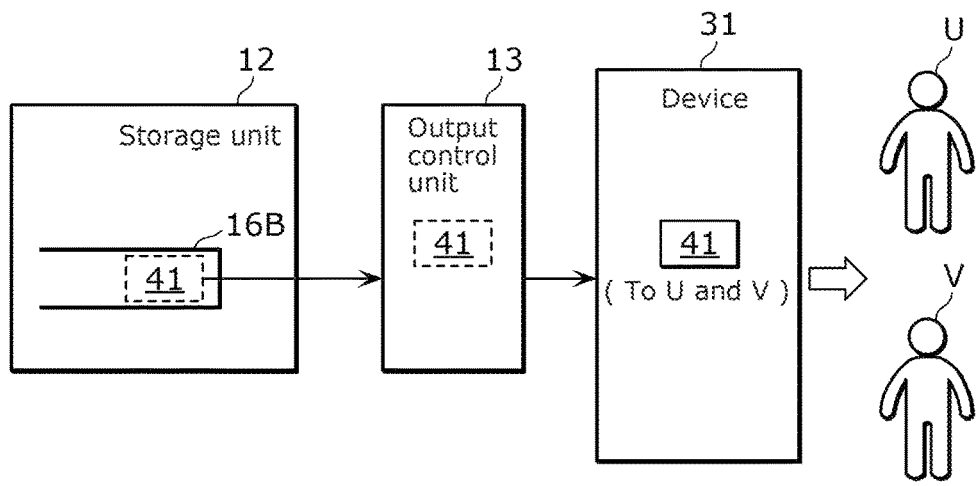

CONTROL METHOD, CONTROLLER, AND RECORDING MEDIUM

CROSS-REFERENCE OF RELATED APPLICATIONS

This application is the U.S. National Phase under 35 U.S.C. § 371 of International Patent Application No. PCT/JP2021/024664, filed on Jun. 30, 2021, which in turn claims the benefit of Japanese Patent Application No. 2021-066033, filed on Apr. 8, 2021, the entire disclosures of which Applications are incorporated by reference herein.

TECHNICAL FIELD

The present disclosure relates to a control method, a controller, and a recording medium.

Background Art

There are known conventional sound or speech output devices among electronic devices, such as home appliances (see for example, Patent Literature 1 (PTL 1)).

PTL 1 discloses a server device that creates sound data used in speech output by an electronic device, on the basis of characteristic information set according to at least one of attribute information on the user of the electronic device and attribute information on the electronic device.

CITATION LIST

Patent Literature

[PTL 1] Japanese Unexamined Patent Application Publication No. 2015-164251

SUMMARY OF INVENTION

Technical Problem

As with a system including the server device disclosed in PTL 1, there are systems that notify a user of information on, for example, an electrical appliance by sound. This type of system is expected to provide a user with more important information for the user.

The present disclosure provides, for example, a control method for properly notifying a user of more important information.

Solution to Problem

A control method according to one aspect of the present disclosure includes obtaining an information item on operation of a first device from the first device, determining, according to the content or attribute of the information item obtained, a priority level for the information item obtained, storing the information item obtained in a memory unit in association with the priority level determined, and preferentially transmitting an information item associated with a higher priority level among information items stored in the memory unit to a second device to cause the second device to output the information item associated with the higher priority level by sound, the information items having been obtained in the obtaining.

In the control method having the preceding aspect, the order in which the second device outputs, by sound, information items provided by the first device is controlled using priority levels, which makes it possible to preferentially output a more important information item by sound. Thus, the control method enables a user to be properly notified of more important information.

In addition, in the storing of the information item obtained, the information item obtained may be stored in a queue associated with the priority level determined for the information item obtained among queues associated with respective priority levels. In the preferentially transmitting of the information item associated with the higher priority level, an information item stored in a queue associated with a higher priority level among the information items may be preferentially transmitted.

In the control method having the preceding aspect, the order in which the second device outputs, by sound, information items provided by the first device is controlled by controlling the priority queues, which makes it possible to preferentially output a more important information item by sound. Thus, the control method enables the user to be properly notified of more important information.

In addition, in the preferentially transmitting of the information item associated with the higher priority level to the second device, whether the second device is in an output state may be determined, and after a determination that the second device is not in the output state, the information item obtained may be transmitted to the second device.

In the control method having the preceding aspect, while the second device is not in an output state, the information item provided by the first device is transmitted to the second device to cause the second device to output the information item by sound. This can avoid a situation in which the second device outputs the information item provided by the first device while outputting another sound, which makes it difficult for the user to clearly hear sounds. Thus, the control method enables the user to be more properly notified of more important information.

In addition, in the preferentially transmitting of the information item associated with the higher priority level to the second device, the information item obtained may be transmitted to the second device after receiving a completion notice indicating that previous sound output by the second device is complete.

In the control method having the preceding aspect, after determining that the second device is not in an output state according to a received completion notice, the information item provided by the first device is transmitted to the second device to cause the second device to output the information item by sound. This can more readily avoid a situation in which the second device outputs the information item provided by the first device while outputting another sound, which makes it difficult for the user to clearly hear sounds. Thus, the control method enables the user to be properly and more readily notified of more important information.

In addition, the obtaining of the information item may include further obtaining an information item from an information provision server.

In the control method having the preceding aspect, the order in which the second device outputs, by sound, information items provided by the external information provision server in addition to the information items provided by the first device is controlled by controlling the priority queues. Thus, a more important information item can be preferentially output by sound in consideration of differences in priority level from the information items provided by the information provision server as well as differences in priority level between the information items provided by the first device. Thus, the control method enables the user to be properly notified of more important information.

In addition, in the determining of the priority level, by referring to predetermined correspondence information in which the content or attribute of the information item obtained is associated with a priority level to be assigned to the information item obtained, the priority level associated with the information item obtained in the predetermined correspondence information is determined as a priority level for the information item obtained.

In the control method having the preceding aspect, a priority level for an information item is determined using the predetermined correspondence information, which makes it possible to determine a priority level more readily. Thus, the control method enables the user to be properly and more readily notified of more important information.

In addition, if adjustment information to adjust an association between the content or attribute of the information item obtained and the priority level to be assigned to the information item obtained is received from a user, the predetermined correspondence information may be adjusted according to the adjustment information, the association being included in the predetermined correspondence information, and the priority level for the information item obtained may be determined using the correspondence information adjusted.

In the control method having the preceding aspect, the correspondence information is adjusted according to the adjustment information received from the user, which enables the correspondence information to reflect user's thoughts on the importance of the information item, Thus, the control method enables the user to be properly notified of more important information in accordance with user's thoughts on the importance of the information item.

In addition, in the preferentially transmitting of the information item associated with the higher priority level to the second device, the information item obtained may be transmitted to the second device while the second device is performing sound output, to cause the second device to interrupt the sound output and output, by sound, the information item obtained.

In the preceding aspect, even while the second device is outputting a sound, it is possible to urgently notify the user of information related to relatively urgent matters (e.g., an earthquake early warning). Thus, the control method enables the user to be more properly notified of more important information.

In addition, when second devices each of which is the second device are caused to output the information item obtained to a user by sound, a determination may be made as to whether each of the second devices is in an output state, and after a determination that each of the second devices is not in the output state, the information item obtained may be transmitted simultaneously to the second devices to cause the second devices to simultaneously output, by sound, the information item obtained.

In the control method having the preceding aspect, when two or more devices are caused to output information to one user by sound, the two or more devices output a sound simultaneously. Thus, the user can clearly recognize that the information is not two information items but one information item. Thus, the control method enables the user to be more properly notified of more important information.

In addition, when the second device is caused to output the information item obtained to users by sound, (a) the information item obtained may be transmitted to the second device the number of times equal to the number of the users to cause the second device to output the information item by sound the number of times equal to the number of the users, or (b) the information item obtained may be transmitted to the second device one time to cause the second device to output the information item by sound one time.

In the control method having the preceding aspect, when one device is caused to output information to more than one user by sound, a sound is output the number of times equal to the number of users, which can clarify that sound output has been performed for each user. In addition, in the above case, by performing sound output one time in total, it may be possible to avoid causing discomfort or stress to the users and contribute to a reduction in the amount of processing performed by the device and a reduction in power consumption, Thus, the control method enables the users to be properly notified of more important information.

In addition, a controller according to another aspect of the present disclosure includes an obtainment unit that obtains an information item on operation of a first device from the first device, a memory unit (a) that determines, according to the content or attribute of the information item obtained, a priority level for the information item obtained and (b) in which the information item obtained is stored in association with the priority level determined, and an output control unit that preferentially transmits an information item associated with a higher priority level among information items stored in the memory unit to a second device to cause the second device to output the information item associated with the higher priority level by sound, the information items having been obtained by the obtainment unit.

The preceding aspect has effects similar to those of the above control method.

A recording medium according to still another aspect of the present disclosure is a non-transitory computer-readable recording medium having recorded thereon a program for causing a computer to execute the control method described above.

The preceding aspect has effects similar to those of the above control method.

It should be noted that these general or specific aspects may be embodied as a system, a method, an integrated circuit, a computer program, or a computer-readable recording medium, such as CD-ROM, or may be embodied by any combination of the system, method, integrated circuit, computer program, and recording medium.

Advantageous Effects of Invention

The control method in the present disclosure enables a user to be properly notified of more important information.

BRIEF DESCRIPTION OF DRAWINGS

FIG. 13 illustrates a third example of sound output timing in the speech system according to the variation of the embodiment.

FIG. 14 illustrates a second example of information, according to the variation of the embodiment, indicating users who are the notification destinations of an information item on operation of a device.

FIG. 15 illustrates a third example of information, according to the variation of the embodiment, indicating a device that outputs a sound to the users.

FIG. 16 illustrates a fourth example of sound output timing in the speech system according to the variation of the embodiment.

DESCRIPTION OF EMBODIMENT

Figure 1:
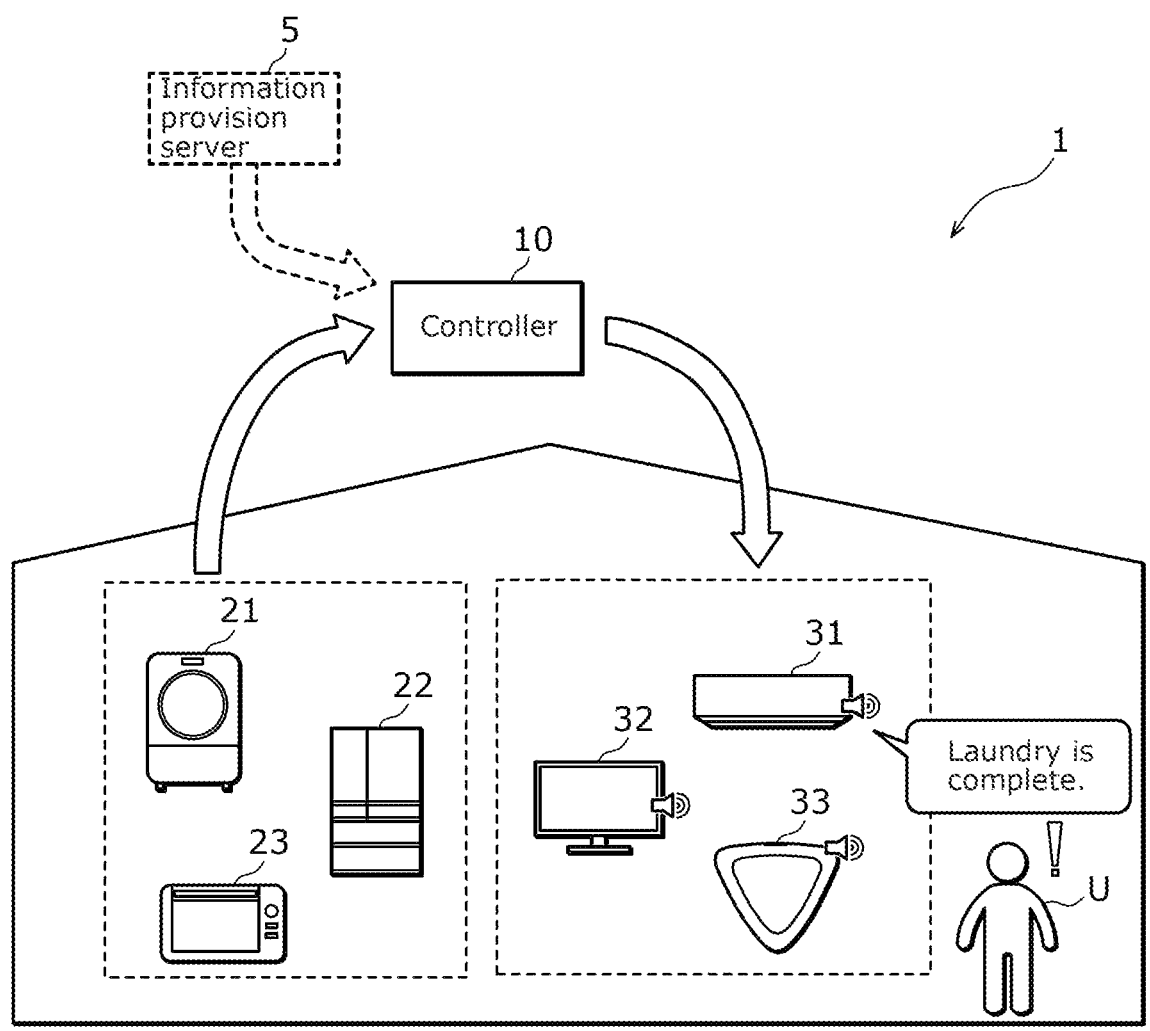
FIG. 1 is a schematic diagram illustrating a configuration of a speech system according to an embodiment.

Hereinafter, an embodiment of the present disclosure is described in detail with reference to the drawings. It should be noted that the embodiment described herein is a specific example of the present disclosure. Thus, for example, the numeric& values, shapes, materials, structural elements, arrangements and connections of the structural elements, steps, and order of the steps described in the embodiment below are mere examples and are not intended to limit the present disclosure. Accordingly, among the structural elements described in the embodiment below, the structural elements not included in the independent claims, which represent the superordinate concepts of the present disclosure, are described as optional structural elements.

The drawings are schematic views and are not necessarily precisely drawn. In addition, in the drawings, identical structural elements are assigned the same reference symbol.

Embodiment

For instance, a speech system and a controller that properly notify a user of more important information are described in an embodiment.

FIG. 1 is a schematic diagram illustrating a configuration of speech system 1 according to an embodiment.

As illustrated in FIG. 1, speech system 1 includes controller 10, devices 21 to 23 (also referred to as device 21 and other devices), devices 31 to 33 (also referred to as device 31 and other devices), and information provision server 5. The controller and devices of speech system 1 are connected to each other via a network (not illustrated) to enable communication therebetween.

Speech system 1 notifies a user of information on operation of device 21, 22, or 23 via controller 10 by causing device 31, 32, or 33 to output the information by sound (that is, speech). Information on operation of device 21 or other device is, for example, information of which device 21 or other device should notify a user. Specifically, the information on operation of device 21 or other device includes information on operation of device 21 or other device (e.g., information indicating a warning or an error) or information indicating the recommended way to use device 21 or other device.

Device 21 and other devices are devices that transmit information (more specifically, home appliances). Device 21 and other devices each include a communication interface for transmitting information on operation to controller 10. Device 21 and other devices correspond to first devices.

Device 21 is, for example, a washing machine. Device 21 washes laundry put in a drum by a user. When for instance laundry is complete, device 21 notifies the user of information indicating the completion of laundry as information on operation. In addition, when an error occurs during the laundry process, device 21 notifies the user of information indicating the occurrence of the error as information on operation.

Device 22 is, for example, a refrigerator. Device 22 maintains the interior of the refrigerator at a refrigerated temperature and stores food and other items put in the refrigerator by a user at the refrigerated temperature. When for instance a refrigerator door is open for a predetermined period or longer, device 22 notifies the user of information indicating that the door is left open as information on operation.

Device 23 is, for example, a microwave oven. Device 23 heats food or other items put into the microwave oven by emitting electromagnetic radiation inside the microwave oven or by heating the interior of the microwave oven by using a heater. When for instance preheating is complete before use, device 23 notifies a user of information indicating the completion of preheating as information on operation.

It should be noted that in the example described here, device 21 and other devices are described as three devices. However, as long as there are one or more devices, there may be any number of devices. In addition to the above devices, for instance, a self-propelled vacuum cleaner (or a robot vacuum cleaner), an air conditioner, and a rice cooker may be used as device 21 and other devices.

Device 31 or other device obtains information on, for example, operation of device 21 or other device from controller 10 and outputs the information by sound. The information may be the information per se obtained from device 21 or other device or sound data corresponding to the information. If the information is the information per se obtained from device 21 or other device, after obtaining the information, device 31 or other device performs processing to convert the information into sound data corresponding to the information. In addition, the information may include information provided by information provision server 5. Device 31 and other devices each include a communication interface for receiving the information from controller 10 and a speaker for outputting a sound related to the received information. Device 31 and other devices correspond to second devices.

Device 31 is, for example, an air conditioner. Device 31 adjusts the temperature and humidity of the air. Device 31 includes a speaker. Device 31 causes the speaker to output information on operation of device 31 by sound and to output information on operation of device 21 or other device by sound under the control of controller 10.

Device 32 is, for example, a television set, Device 32 receives airwaves or communication data and outputs a video corresponding to a video signal included in the received airwaves or a sound corresponding to a sound signal included in the received communication data. Device 32 includes a speaker. Device 32 causes the speaker to output the sound corresponding to the sound signal and to output information on operation of device 21 or other device by sound under the control of controller 10.

Device 33 is, for example, a self-propelled vacuum cleaner. Device 33 is self-propelled and cleans a floor by removing dirt and dust on the floor. Device 33 includes a speaker. Device 33 causes the speaker to output information on operation of device 33 by sound and to output information on operation of device 21 or other device by sound under the control of controller 10.

It should be noted that in the example described here, device 31 and other devices are three devices. However, as long as there are one or more devices, there may be any number of devices. In addition to the above devices, devices including a speaker (e.g., a pet camera, an intercommunication system, and lighting equipment) may be used as device 31 and other devices.

Information provision server 5 is, for example, a web server that is connected to the Internet and provides general information. More specifically, information provision server 5 includes a server that provides, for example, information on natural disasters, such as an earthquake, or information on weather conditions. The method by which information provision server 5 provides information may be a method of voluntarily providing information (put method) or a method of providing information in response to a request from controller 10 (get method), The put method may be employed when for instance notifying information related to relatively urgent matters, such as an earthquake early warning or a weather change (e.g., heavy rain). The get method, on the other hand, may be employed when for instance notifying information related to relatively less urgent matters, such as the weather forecast of the day or a delivery arrival schedule. It should be noted that information provision server 5 is not an essential element.

Controller 10 obtains information on operation of device 21 or other device and transmits sound data corresponding to the information to an appropriate device among device 31 and other devices at proper timing, By device 31 or other device outputting the transmitted sound data by sound, the sound data is expected to be heard by the user. It should be noted that device 31 or other device may include controller 10, In other words, device 31 or other device may have the function of controller 10.

Hereinafter, controller 10 is described in detail.

Figures 2, 3:
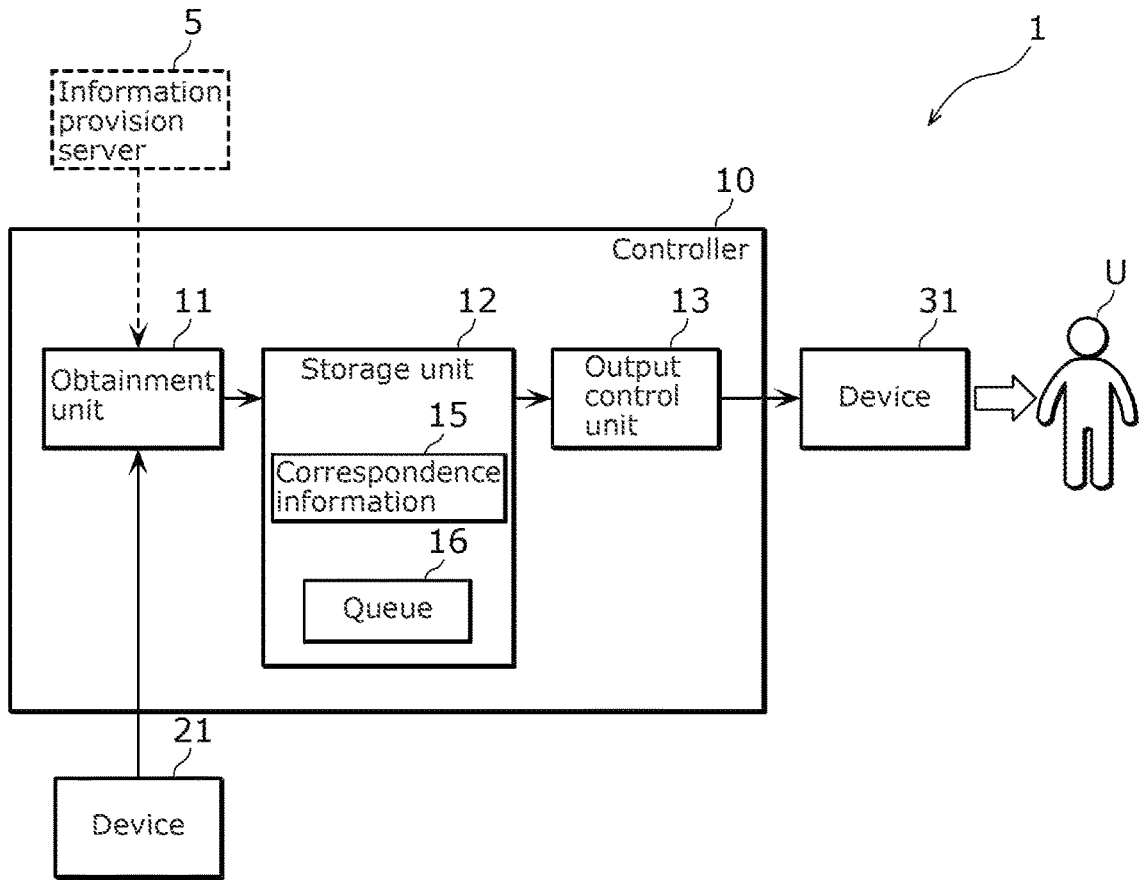
FIG. 2 is a block diagram illustrating a configuration of a controller according to the embodiment.
FIG. 3 illustrates examples of information items provided by a device according to the embodiment.

FIG. 2 is a block diagram illustrating a configuration of controller 10 according to the embodiment.

As illustrated in FIG. 2, controller 10 includes obtainment unit 11, storage unit 12, and output control unit 13. The functional elements of controller 10 may be caused to function by the processor (e.g., a central processing unit (CPU)) (not illustrated) of controller running one or more predetermined programs by using memory (not illustrated).

Obtainment unit 11 is a functional element that obtains, from each of device 21 and other devices, an information item on operation of the device. Obtainment unit 11 may further obtain an information item from information provision server 5. If information provision server 5 voluntarily provides an information item, obtainment unit 11 obtains the provided information item. In addition, if information provision server 5 provides an information item in response to a request, obtainment unit 11 transmits a request and obtains an information item that information provision server 5 has provided in response to the transmitted request. Obtainment unit 11 may transmit a request at a predetermined time or predetermined times.

Storage unit 12 is a functional element for storing the information item obtained by obtainment unit 11 in queue 16. Queue 16 is an example of a memory unit. Queue 16 includes queues (described later). A queue is a type of data structure and corresponds to a data structure that outputs data on a first-in, first-out principle (i.e., a first-in, first-out (FIFO) data structure).

Storage unit 12 determines a priority level for the information item obtained by obtainment unit 11, according to the content or attribute of the information item.

Storage unit 12 then stores the information item in the memory unit in association with the determined priority level, Specifically, storage unit 12 stores the information item in the memory unit by storing the information item in a queue associated with the priority level determined for the information item among the queues associated with respective priority levels.

When determining a priority level for the information item, storage unit 12, for instance, refers to predetermined correspondence information 15 in which the content or attribute of each information item and a priority level to be assigned to the information item are associated with each other and determines, as a priority level for the obtained information item, a priority level associated with the obtained information item in correspondence information 15. The attribute of an information item is, for example, a device or a business operator that is the transmission source of the information item. In the example described here, there are three priority levels, which are high, intermediate, and low priority levels. However, the priority levels do not have to be referred to as the high, intermediate, and low priority levels. In addition, the number of priority levels is not limited to three, and as long as there are two or more priority levels, there may be any number of priority levels.

It should be noted that one or more priority levels subordinate to each priority level described above (also referred to as sub-priority levels) may be further set. In this case, for instance, three sub-priority levels A, B, and C may be set as priority levels subordinate to the intermediate priority level. In this case, information on the priority levels included in correspondence information 15 includes information on the sub-priority levels.

It should be noted that correspondence information 15 may be adjusted by the user. Specifically, storage unit 12 may receive, from the user, adjustment information to adjust an association between the content or attribute of an information item and a priority level to be assigned to the information item, the association being included in correspondence information 15. When receiving the adjustment information from the user, storage unit 12 adjusts correspondence information 15 according to the adjustment information and determines a priority level for the obtained information item by using adjusted correspondence information 15, As with the priority levels, the sub-priority levels may also be adjusted by the user.

Output control unit 13 is a functional element that transmits an information item stored in storage unit 12 to device 31 or other device. Specifically, output control unit 13 retrieves an information item from storage unit 12 and transmits the retrieved information item to device 31 or other device.

When retrieving an information item from storage unit 12, output control unit 13 preferentially retrieves an information item associated with a higher priority level among information items stored in the memory unit. Specifically, when retrieving an information item from storage unit 12, output control unit 13 preferentially retrieves an information item stored in a queue associated with a higher priority level among the queues. Device 31 or other device receives the information item transmitted by output control unit 13 and outputs the received information item by sound. In other words, output control unit 13 transmits the information item retrieved from storage unit 12 to device 31 or other device to cause device 31 or other device to output the retrieved information item by sound.

It should be noted that output control unit 13 may transmit the information item to device 31 or other device after determining that device 31 or other device is not outputting a sound (is not in an output state). In other words, when transmitting an information item to device 31 or other device, output control unit 13 determines whether device 31 or other device is in an output state. Then, if it is determined that device 31 or other device is not in an output state (is in a non-output state), output control unit 13 transmits the information item to device 31 or other device. The above case is based on the premise that output control unit 13 has the function of determining whether device 31 or other device is in an output state. Output control unit 13 may determine whether device 31 or other device is in an output state by for example querying device 31 or other device about whether the device is in an output state and obtaining, as an answer to the query, information indicating whether the device is in an output state. In addition, if device 31 and other devices each have the function of voluntarily transmitting information indicating whether the device is in an output state, output control unit 13 may determine whether device 31 or other device is in an output state according the obtained information.

In addition, if device 31 and other devices each have the function of transmitting a notice indicating that previous sound output by the device is complete (also referred to as a completion notice), output control unit 13 may determine whether device 31 or other device is in an output state on the basis of the reception of a completion notice. In this case, for a period from when output control unit 13 transmits an information item to device 31 or other device until output control unit 13 receives a completion notice from device 31 or other device, output control unit 13 determines that device 31 or other device is in an output state and waits. Then, after receiving a completion notice, output control unit 13 determines that device 31 or other device is not in an output state and outputs an information item to device 31 or other device. In the example described below, output control unit 13 transmits an information item to device 31 or other device by using a completion notice.

It should be noted that controller 10 may convert an information item obtained from device 21 or other device into sound data to output the information item by sound. Here, the converted sound data is also referred to as information. It should be noted that obtainment unit 11, storage unit 12, or output control unit 13 may perform the conversion processing.

FIG. 3 illustrates examples of information items provided by device 21 or other device according to the embodiment. The information items illustrated in FIG. 3 are examples of information items provided by device 31, which is a washing machine.

Each of entries included in the information items illustrated in FIG. 3 includes a number (#), a type, and details.

The number is a number assigned to the entry and may function as an identifier.

The type is the type of an information item indicated by the entry and may include, for example, an error or a notice.

The details are the details of the information item indicated by the entry.

For instance, for entry #1 illustrated in FIG. 3, the type is an error, and the details show that the door is not locked. Entry #1 is error information indicating that the washing machine door is not locked.

In addition, for entry #2 illustrated in FIG. 3, the type is an error, and the details show that water cannot be drained. Entry #2 is error information indicating that water cannot be drained from a washing machine drum.

In addition, for entry #11 illustrated in FIG. 3, the type is a notice, and the details show that laundry is complete. Entry #11 is notice information indicating that washing by the washing machine is complete.

When error information or notice information on operation of device 21 or other device arises, device 21 or other device transmits an information item including corresponding details illustrated in FIG. 3 to controller 10. Obtainment unit 11 of controller 10 receives the information item from device 21, It should be noted that device 21 or other device may transmit an information item including a number rather than details to controller 10. In this case, controller 10 has the entries illustrated in FIG. 3 and obtains details corresponding to the number transmitted by device 21 or other device.

Figure 4:
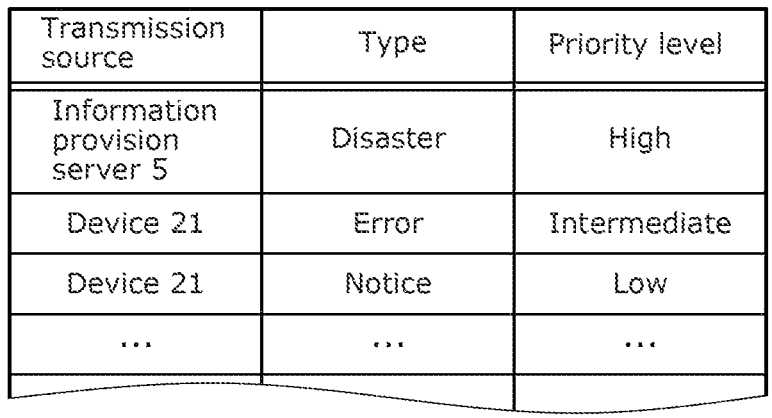
FIG. 4 illustrates an example of correspondence information according to the embodiment.

It should be noted that an information item provided by information provision server 5 has a configuration similar to that of each information item illustrated in FIG. 3. The type of an information item provided by information provision server 5 may include, for example, a disaster or a weather condition, FIG. 4 is an example of correspondence information according to the embodiment. The correspondence information illustrated in FIG. 4 is used when storage unit 12 determines a priority level for an information item.

The entries included in the correspondence information illustrated in FIG. 4 indicate priority levels to be assigned to information items. In other words, each entry indicates a correspondence between the attribute or type of an information item and a priority level to be assigned to the information item by storage unit 12.

For instance, the first entry illustrated in FIG. 4 indicates that the high priority level should be assigned to information on a disaster (that is, information whose type is a disaster) transmitted by information provision server 5.

In addition, the second entry indicates that the intermediate priority level should be assigned to error information (that is, information whose type is an error) transmitted by device 21 or other device.

In addition, the third entry indicates that the low priority level should be assigned to notice information (that is, information whose type is a notice) transmitted by device 21 or other device.

Figure 5:
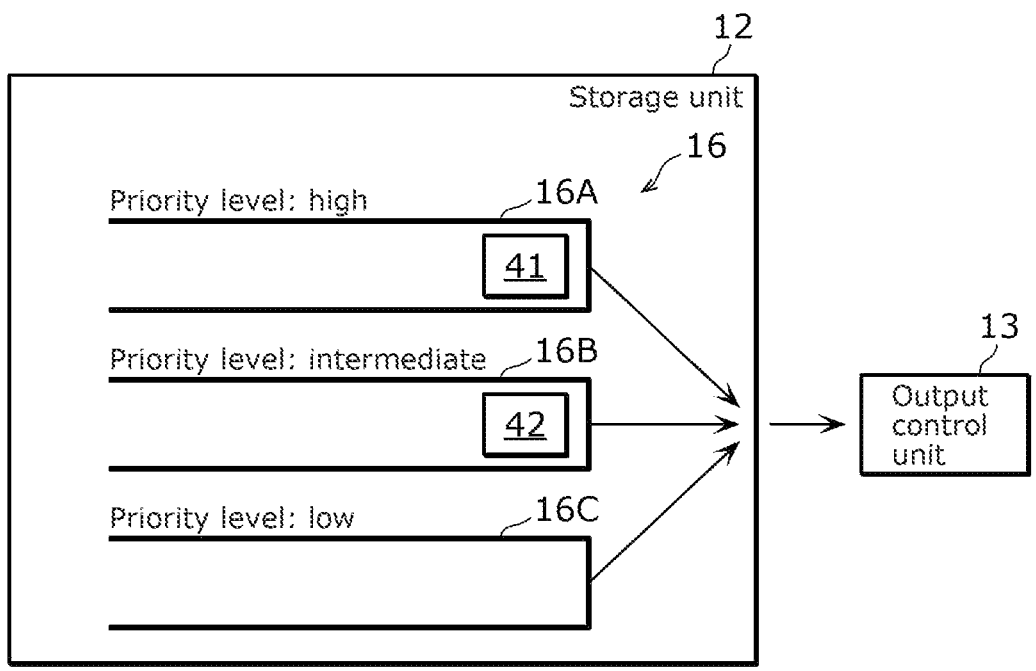
FIG. 5 illustrates a method of performing queue control according to the embodiment.

FIG. 5 illustrates a method of performing queue control according to the embodiment.

Queue 16 includes queue 16A corresponding to the high priority level, queue 166 corresponding to the intermediate priority level, and queue 16C corresponding to the low priority level. As described above, storage unit 12 assigns a priority level to an information item by referring to correspondence information 15 (see FIG. 4) and then stores the information item in a queue associated with the assigned priority level.

As an example, in FIG. 5, information 41 having the high priority level is stored in queue 16A, and information 42 having the intermediate priority level is stored in queue 16B.

In this case, output control unit 13 retrieves information 41 stored in queue 16A associated with a higher priority level (that is, the high priority level) among information 41 and information 42 and transmits information 41 to device 31 or other device. Then, output control unit 13 retrieves information 42 remaining in queue 16 (that is, information 42 stored in queue 16B) and transmits information 42 to device 31 or other device.

Hereinafter, a lore detailed example is described in which output control unit 13 retrieves information items from queue 16 and transmits the information items to device 31.

Figure 6:
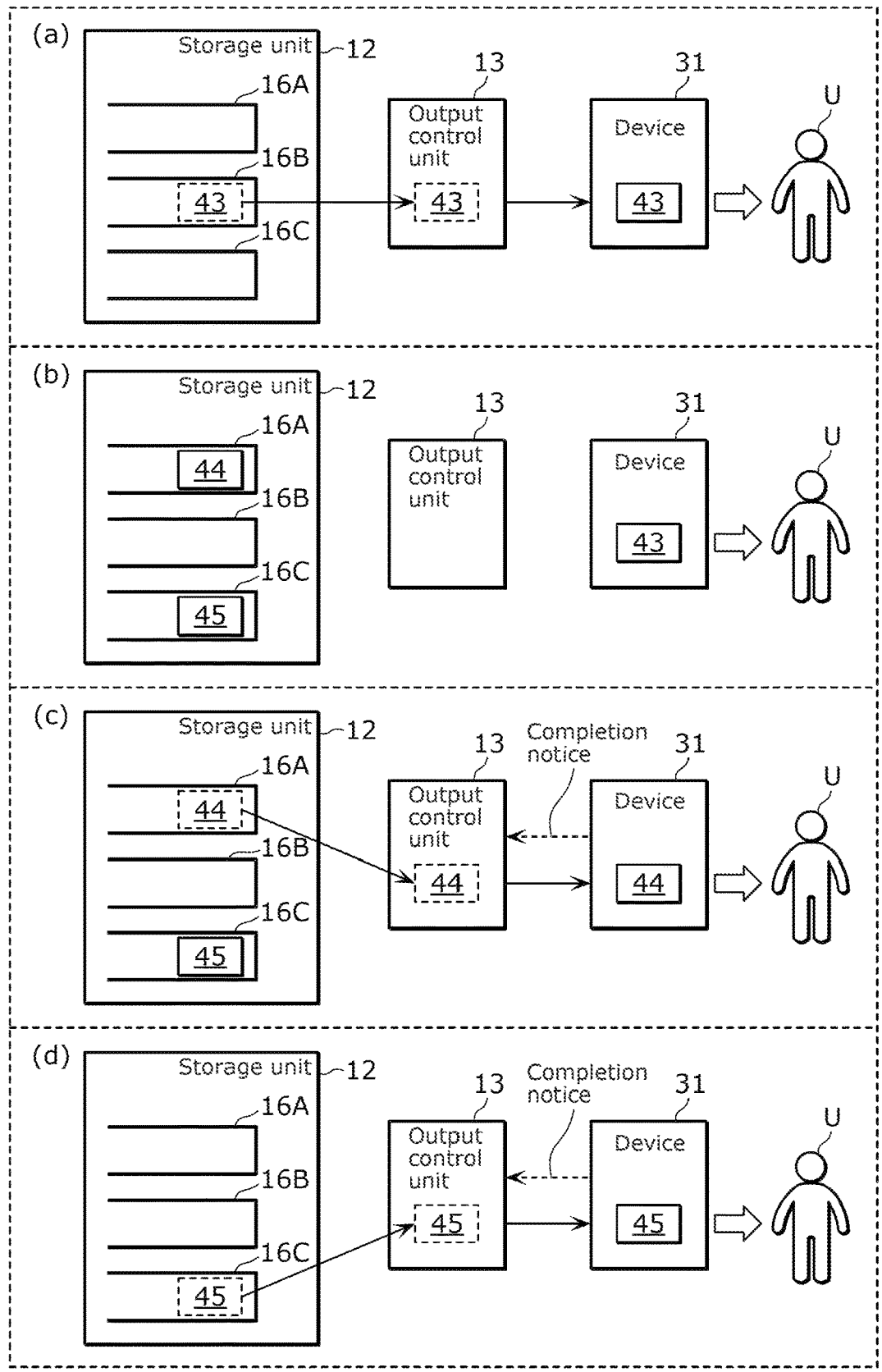
FIG. 6 illustrates an example of the queue control according to the embodiment.

FIG. 6 illustrates an example of queue control according to the embodiment. Here, obtainment unit 11 obtains information 43 having the intermediate priority level, information 44 having the high priority level, and information 45 having the low priority level sequentially in the order named.

First, in (a) in FIG. 6, storage unit 12 stores information 43 in queue 166. Output control unit 13 retrieves information 43 from queue 166 and transmits information 43 to device 31. Device 31 receives information 43 and outputs information 43 by sound.

Next, in (b) in FIG. 6, while device 31 is outputting information 43 by sound, storage unit 12 stores information 44 in queue 16A and information 45 in queue 16C.

Then, in (c) in FIG. 6, output control unit 13 receives, from device 31, a completion notice indicating that sound output of information 43 is complete. After receiving the completion notice, output control unit 13 retrieves information 44 stored in a queue associated with a higher priority level (that is, the high priority level) among information 44 and information 45 and transmits information 44 to device 31.

Finally, in (d) in FIG. 6, output control unit 13 receives, from device 31, a completion notice indicating that sound output of information 44 is complete. After receiving the completion notice, output control unit 13 retrieves information 45 and transmits information 45 to device 31.

In this manner, controller 10 causes device 31 to output information 43, information 44, and information 45 by sound in the proper order based on the priority levels set for the respective types of the information items.

Processing (also referred to as a control method) performed by controller 10 having the above configuration is described hereinafter.

Figure 7:
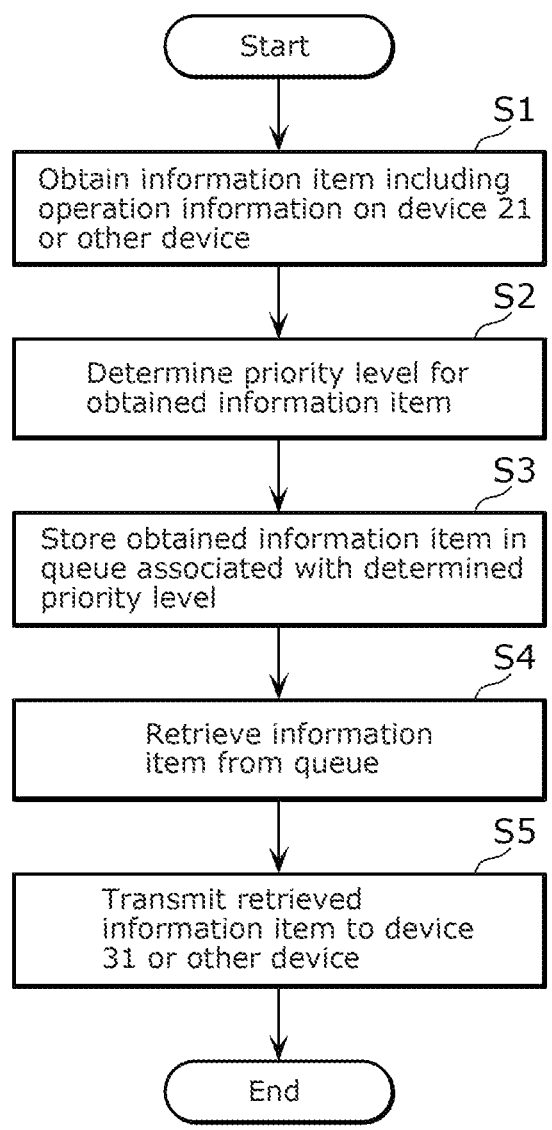
FIG. 7 is a flowchart illustrating a control method according to the embodiment.

FIG. 7 is a flowchart illustrating a control method according to the embodiment.

In step S1, obtainment unit 11 obtains an information item on operation of device 21 or other device.

In step S2, storage unit 12 determines a priority level for the information item obtained in step S1.

In step S3, storage unit 12 stores the information item obtained in step S1 in a queue associated with the priority level determined in step S2. Step S3 corresponds to the processing in which storage unit 12 stores the information item obtained in step S1 in the memory unit in association with the priority level determined in step S2.

In step S4, storage unit 12 retrieves an information item from one of the queues of storage unit 12, Here, storage unit 12 preferentially retrieves an information item stored in a queue associated with a higher priority level. Step 4 corresponds to the processing in which storage unit 12 preferentially retrieves an information item associated with a higher priority level among information items stored in the memory unit.

In step S5, output control unit 13 transmits the information item retrieved in step S4 to device 31 or other device to cause device 31 or other device to output the information item by sound.

By performing the processing illustrated in FIG. 7, controller 10 can properly notify a user of more important information.

Variation of Embodiment

In a variation of the embodiment, variations of processing performed by, for example, a speech system and a controller that properly notify a user of more important information are described.

In the example described here, speech system 1 outputs information by sound to more than one user by using device 31 and other device. Specifically, case 1 in which one device notifies one user and another device notifies another user and case 2 in which one device notifies one user and two devices notify another user are described.

Case 1: One Device Notifies One User, and Another Device Notifies Another User

Figures 8, 9, 10:
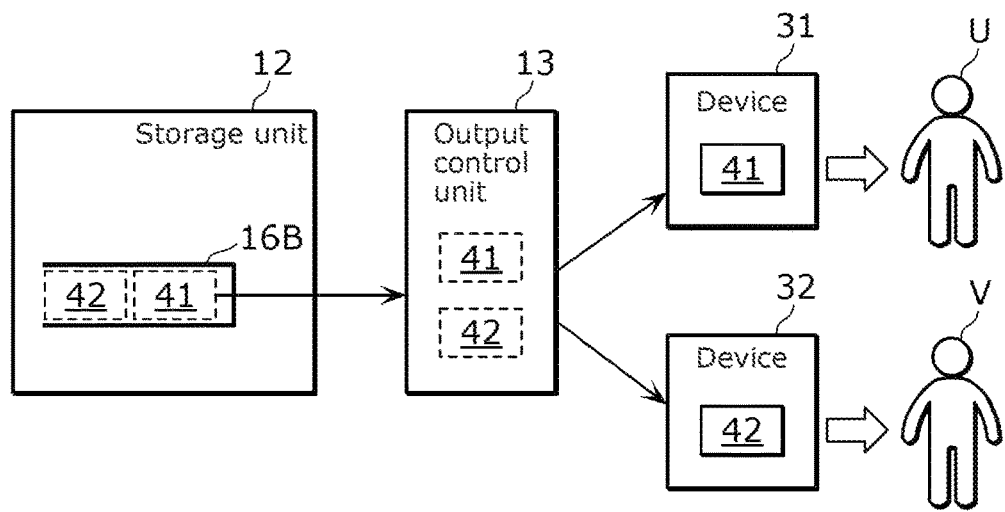
FIG. 8 illustrates a configuration of a speech system according to a variation of the embodiment and a first example of sound output timing.
FIG. 9 illustrates a first example of information, according to the variation of the embodiment, indicating users who are the notification destinations of information items on operation of respective devices.
FIG. 10 illustrates a first example of information, according to the variation of the embodiment, indicating devices that output a sound to the respective users.

FIG. 8 is a schematic diagram illustrating a configuration of speech system 1 according to a variation and a first example of sound output timing. FIG. 9 illustrates an example of information, according to the variation, indicating users who are the notification destinations of information items on operation of respective devices, FIG. 10 illustrates a first example of information, according to the variation, indicating devices that output a sound to the respective users.

As illustrated in FIG. 8, speech system 1 notifies user U of an information item on operation of device 21 by causing device 31 to output a sound to user U and notifies user V of an information item on operation of device 22 by causing device 32 to output a sound to user V.

As with output control unit 13 in the embodiment, output control unit 13 retrieves an information item from storage unit 12 and transmits the retrieved information item to device 31 or other device. At this time, output control unit 13 controls the timing at which the information item is transmitted to device 31 or other device by considering to which user the information item will be output by sound.

Output control unit 13 has setting information (see FIG. 9) indicating that to which user each information item on operation of device 21 and other device should be notified by sound output and setting information (see FIG. 10) indicating that which device should notify a user of an information item obtained by obtainment unit 11 by outputting a sound. The setting information illustrated in FIG. 9 and the setting information illustrated in FIG. 10 are pre-set by, for example, users U and V themselves.

In the setting information illustrated in FIG. 9, user U is the notification destination of an information item on operation of device 21, and user V is the notification destination of an information item on operation of device 22.

In the setting information illustrated in FIG. 10, device 31 is set as the device that outputs a sound to user U, and device 32 is set as the device that outputs a sound to user V.

Under the above conditions, consider the case in which information 41 on operation of device 21 transmitted by device 21 and information 42 on operation of device 22 transmitted by device 22 are stored in storage unit 12 (e.g., queue 16B) in the order named. Operation in the above case is described below. It should be noted that the following account applies regardless of the priority level of the queue in which information 41 and information 42 are stored.

Output control unit 13 retrieves information 41 from queue 16B at the time point when information 41 is stored in storage unit 12. Output control unit 13 refers to the setting information illustrated in FIG. 9 and identifies user U as the notification destination of information 41 since the transmission source of information 41 is device 21. In addition, output control unit 13 refers to the setting information illustrated in FIG. 10 and identifies that information that should be notified to user U is output by device 31 by sound, Thus, output control unit 13 transmits information 41 to device 31 to cause device 31 to output information 41 by sound. Information 41 output by device 31 by sound is expected to be heard by user U.

Then, output control unit 13 retrieves information 42 from queue 16B at the time point when information 42 is stored in storage unit 12, Output control unit 13 refers to the setting information illustrated in FIG. 9 and identifies user V as the notification destination of information 42 since the transmission source of information 42 is device 22. In addition, output control unit 13 refers to the setting information illustrated in FIG. 10 and identifies that information that should be notified to user V is output by device 32 by sound. Thus, output control unit 13 transmits information 42 to device 32 to cause device 32 to output information 42 by sound, Information 42 output by device 32 by sound is expected to be heard by user V.

Device 32 may output a sound while device 31 is outputting a sound.

By doing so, one device properly notifies one user, and another device properly notifies another user.

Case 2: One User Notifies One User, and Two Devices Notify Another User

Figures 11, 12:
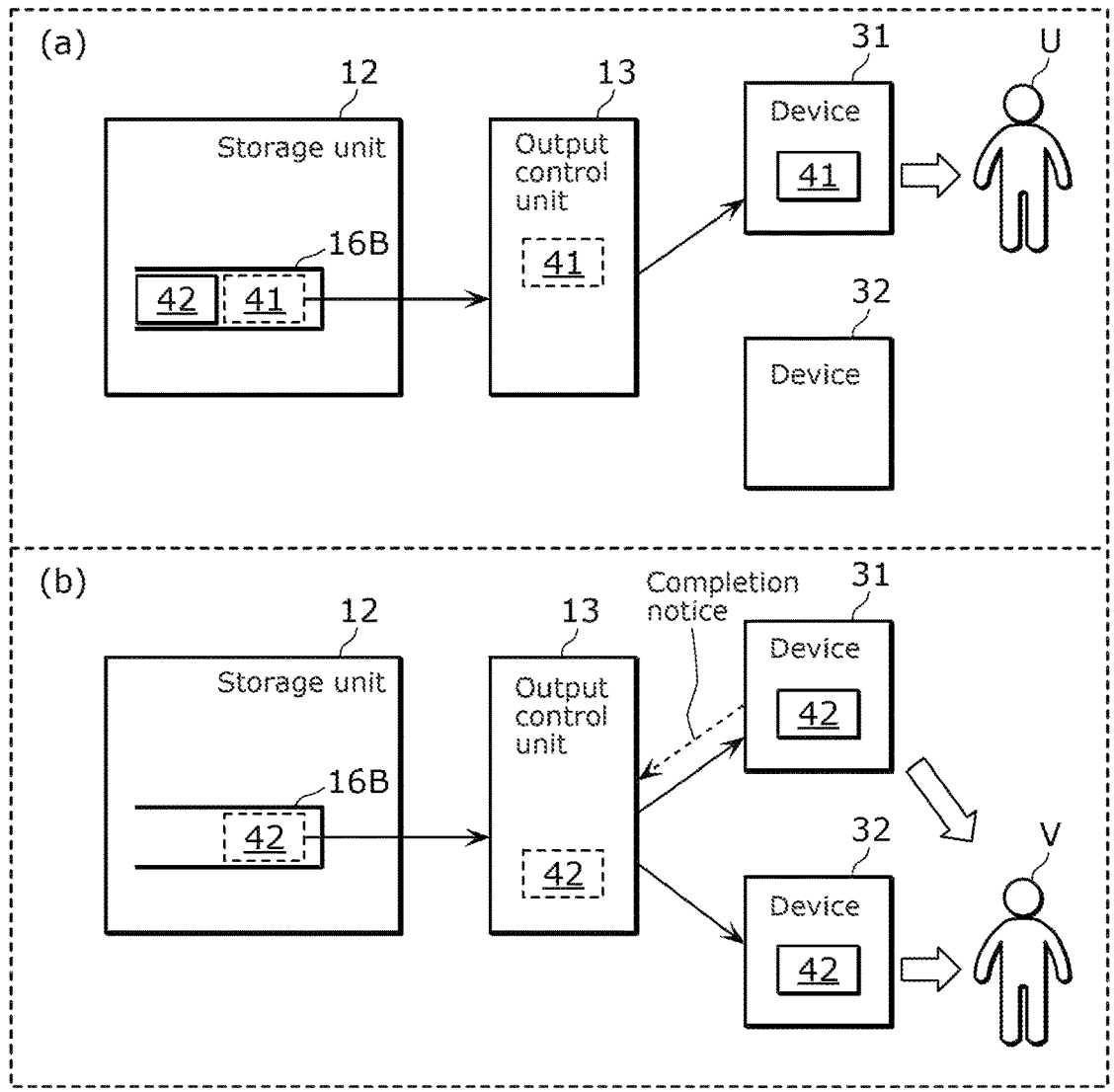
FIG. 11 illustrates a second example of sound output timing in the speech system according to the variation of the embodiment.
FIG. 12 illustrates a second example of information, according to the variation of the embodiment, indicating devices that output a sound to the respective users.

FIG. 11 illustrates a second example of sound output timing in speech system 1 according to the variation. FIG. 12 illustrates a second example of information, according to the variation, indicating devices that output a sound to the respective users.

As illustrated in (a) and (b) in FIG. 11, speech system 1 notifies user U of an information item on operation of device 21 by causing device 31 to output a sound to user U and notifies user V of an information item on operation of device 22 by causing each of devices 31 and 32 to output a sound to user V.

As illustrated in FIG. 12, devices 31 and 32 are set as the devices that each output a sound to user V. As with case 1 described above, device 31 is the device that outputs a sound to user U. In addition, the setting information (see FIG. 9) indicating that to which user each information item on operation of device 21 and other device should be notified by sound output is the same as that used in case 1 described above.

As illustrated in (a) in FIG. 11, output control unit 13 retrieves information 41 from storage unit 12 at the time point when information 41 is stored in storage unit 12 and transmits information 41 to device 31 to cause device 31 to output information 41 by sound, Information 41 output by device 31 by sound is expected to be heard by user U.

As illustrated in (b) in FIG. 11, output control unit 13 retrieves information 42 from storage unit 12 at the time point when information 42 is stored in storage unit 12, Output control unit 13 refers to the setting information illustrated in FIG. 9 and identifies user V as the notification destination of information 42 since the transmission source of information 42 is device 22. In addition, output control unit 13 refers to the setting information illustrated in FIG. 10 and identifies that information that should be notified to user V is output by devices 31 and 32 by sound.

Here, while device 31 is outputting information 41 by sound, output control unit 13 refrains from transmitting information 42 to devices 31 and 32 and waits. This is because if output control unit 13 transmits information 42 to devices 31 and 32, device 31 further outputs information 42 by sound while outputting information 41 by sound, which makes it difficult for users U and V to clearly hear information 41 and information 42. In addition, if device 31 outputs information 42 by sound after outputting information 41 by sound, since device 32 outputs information 42 by sound soon after receiving information 42, device 31 and device 32 output information 42 by sound at different times. If devices 31 and 32 output a sound at different times, user V may not be able to recognize whether information 42 is one information item or two information items. In other words, user V may not be able to recognize whether user V has received one error or notice or two errors or notices including the same content. If devices 31 and 32 output the sound simultaneously, user V can clearly recognize that information 42 is an information item.

After receiving a completion notice indicating that sound output of information 41 by device 31 is complete, output control unit 13 transmits information 42 simultaneously to devices 31 and 32. In this way, output control unit 13 causes devices 31 and 32 to simultaneously output information 42.

By doing so, one device properly notifies one user, and two devices properly notifies another user.

It should be noted that if device 31 outputs an information item on operation of device 21 transmitted by device 21 to more than one user by sound, the same sound can be output twice, or the same sound can be output once by controlling the number of times of output of the same sound.

In other words, in a case in which controller 10 causes device 21 to output an information item to more than one user by sound, (a) controller 10 may cause device 21 to output the information item by sound the number of times equal to the number of users by transmitting the information item to device 21 the number of times equal to the number of the users, or (b) controller 10 may cause device 21 to output the information item by sound one time by transmitting the information item to device 21 one time.

Details are described below.

FIG. 13 illustrates a configuration of speech system 1 according to the variation and a third example of sound output timing. FIG. 14 illustrates a second example of information, according to the variation, indicating users who are the notification destinations of an information item on operation of a device. FIG. 15 illustrates a third example of information, according to the variation, indicating a device that outputs a sound to the users.

In the setting information illustrated in FIG. 14, users U and V are set as the notification destinations of an information item on operation of device 21.

In the setting information illustrated in FIG. 15, device 31 is set as both the device that outputs a sound to user U and the device that outputs a sound to user V.

As illustrated in FIG. 13, output control unit 13 retrieves information 41 from storage unit 12 at the time point when information 41 is stored in storage unit 12, Output control unit 13 then transmits information 41 to device 31 to output information 41 to user U by sound. Device 31 is caused to output information 41 by sound. Information 41 output by device 31 by sound is expected to be heard by user U.

Then, output control unit 13 transmits information 41 to device 31 to output information 41 to user V by sound. Device 31 is caused to output information 41 by sound. Information 41 output by device 31 by sound is expected to be heard by user V.

By doing so, speech system 1 outputs an information item on operation of device 21 by sound one time for each of users U and V. This can clarify that sound output has been performed for each user.

In addition, by referring to the setting information illustrated in FIG. 14 and the setting information illustrated in FIG. 15, output control unit 13 can know in advance that if device 21 transmits an information item on operation under the conditions of the setting information illustrated in FIG. 14 and the setting information illustrated in FIG. 15, device 31 will output the same sound twice. For instance, output control unit 13 learns from FIG. 14 that information on operation of device 21 should be notified to users U and V. Since device 31 is set as the device that notifies users U and V, output control unit 13 can know in advance that device 31 will output the same sound twice.

FIG. 16 illustrates a fourth example of sound output timing in speech system 1 according to the variation.

As illustrated in FIG. 16, if output control unit 13 recognizes that device 31 will output the same sound twice, output control unit 13 causes device 31 to refrain from outputting the sound one of two times and output the sound just one time. Information 41 output by device 31 by sound is expected to be heard by both users U and V.

By doing so, it is possible to avoid outputting the same sound twice and contribute to a reduction of the amount of processing performed by device 31 and a reduction of power consumption.

It should be noted that in the example described above, output control unit 13 determines whether device 31 or other device is in an output state by using a completion notice. However, this is not the only example. Output control unit 13 may transmit information to device 31 or other device while device 31 or other device is in an output state. In this case, device 31 in an output state is caused to interrupt sound output and output the transmitted information by sound. Thus, even while device 31 or other device is outputting a sound, controller 10 can urgently notify a user of information related to relatively urgent matters (e.g., an earthquake early warning).

Thus, in the control method in the embodiment and the variation, the order in which a second device outputs, by sound, information items provided by a first device is controlled by controlling priority queues. Accordingly, it is possible to preferentially output a more important information item by sound, Thus, the control method enables a user to be properly notified of more important information.

In addition, in the control method, when the second device is not in an output state, an information item transmitted by the first device is transmitted to the second device to cause the second device to output the information item by sound. This can avoid a situation in which the second device outputs the information item provided by the first device while outputting another sound, which makes it difficult for the user to clearly hear sounds. Thus, the control method enables the user to be properly notified of more important information.

In addition, in the control method, after determining that the second device is not in an output state on the basis of the reception of a completion notice, an information item transmitted by the first device is transmitted to the second device to cause the second device to output the information item by sound. This can more readily avoid a situation in which the second device outputs the information item provided by the first device while outputting another sound, which makes it difficult for the user to dearly hear sounds. Thus, the control method enables the user to be properly and more readily notified of more important information.

In addition, in the control method, the order in which the second device outputs, by sound, information items provided by the external information provision server in addition to the information items provided by the first device is controlled by controlling the priority queues. Thus, a more important information item can be preferentially output by sound in consideration of differences in priority level from the information items provided by the information provision server as well as differences in priority level between the information items provided by the first device. Thus, the control method enables the user to be properly notified of more important information.

In addition, in the control method, a priority level for an information item is determined using the predetermined correspondence information, which makes it possible to determine the priority level more readily, Thus, the control method enables the user to be properly and more readily notified of more important information.

In addition, in the control method, the correspondence information is adjusted according to adjustment information received from the user, which enables the correspondence information to reflect user's thoughts on the importance of the information item. Thus, the control method enables the user to be properly notified of more important information in accordance with user's thoughts on the importance of the information item.

In addition, in the control method, even while a device is outputting a sound, it is possible to urgently notify the user of information related to relatively urgent matters (e.g., an earthquake early warning), Thus, the control method enables the user to be more properly notified of more important information.

In addition, in the control method, when two or more devices are caused to output information to one user by sound, the two or more devices output a sound simultaneously. Thus, the user can clearly recognize that the information is not two information items but one information item. Thus, the control method enables the user to be properly notified of more important information.

In addition, in the control method, when one device is caused to output information to more than one user by sound, a sound is output the number of times equal to the number of users, which can clarify that sound output has been performed for each user. In addition, in the above case, if sound output is performed one time in total, this can contribute to a reduction of the amount of processing and a reduction of power consumption, Thus, the control method enables the user to be properly notified of more important information.

The controllers in the embodiment and in the variation have effects similar to those of the above control methods.

The embodiment and variation are provided to exemplify the technique in the present disclosure. For this purpose, the appended drawings and detailed explanations are provided.

Thus, the structural elements included in the appended drawings and detailed explanations include not only structural elements essential to address an issue but also structural elements that are not essential to address the issue and are provided to exemplify the technique. Accordingly, such non-essential structural elements should not be immediately recognized as essential structural elements just because the non-essential structural elements are included in the appended drawings and detailed explanations.

In addition, the embodiment and variation described above are provided to exemplify the technique in the present disclosure. Thus, for instance, various changes, replacement, addition, and omission can be made within the scope of the claims or the scope of equivalents to the claims.

INDUSTRIAL APPLICABILITY

The present disclosure can be used in equipment that controls a device capable of outputting a sound.

REFERENCE SIGNS LIST 1 speech system
5 information provision server
10 controller
11 obtainment unit
12 storage unit
13 output control unit
15 correspondence information
16, 16A, 16B, 16C queue
21, 22, 23, 31, 32, 33 device
41, 42, 43, 44, 45 information
U, V user

The invention claimed is:

1. A control method comprising:
obtaining an information item on operation of a first device from the first device;
determining, according to content or an attribute of the information item obtained, a priority level for the information item obtained;
storing the information item obtained in a memory unit in association with the priority level determined; and
preferentially transmitting an information item associated with a higher priority level among information items stored in the memory unit to a second device to cause the second device to output the information item associated with the higher priority level by sound, the information items having been obtained in the obtaining, wherein:
in the determining of the priority level, by referring to predetermined correspondence information in which the content or the attribute of the information item obtained is associated with a priority level to be assigned to the information item obtained, the priority level associated with the information item obtained in the predetermined correspondence information is determined as a priority level for the information item obtained,
the correspondence information is correspondence information held by a control device that is performing the control method, and
the determining of the priority level includes determining of the priority level for the information item obtained, by comparing the information item obtained and the correspondence information when the control device obtains the information item.

2. The control method according to claim 1,
wherein in the storing of the information item obtained, the information item obtained is stored in a queue associated with the priority level determined for the information item obtained among a plurality of queues associated with respective priority levels, and
in the preferentially transmitting of the information item associated with the higher priority level, an information item stored in a queue associated with a higher priority level among the information items is preferentially transmitted.

3. The control method according to claim 1,
wherein in the preferentially transmitting of the information item associated with the higher priority level to the second device, whether the second device is in an output state is determined, and
after a determination that the second device is not in the output state, the information item obtained is transmitted to the second device.

4. The control method according to claim 1,
wherein in the preferentially transmitting of the information item associated with the higher priority level to the second device, the information item obtained is transmitted to the second device after receiving a completion notice indicating that previous sound output by the second device is complete.

5. The control method according to claim 1,
wherein the obtaining of the information item includes further obtaining an information item from an information provision server.

6. The control method according to claim 1,
wherein if adjustment information to adjust an association between the content or the attribute of the information item obtained and the priority level to be assigned to the information item obtained is received from a user, the predetermined correspondence information is adjusted according to the adjustment information, the association being included in the predetermined correspondence information, and
the priority level for the information item obtained is determined using the correspondence information adjusted.

7. The control method according to claim 1,
wherein in the preferentially transmitting of the information item associated with the higher priority level to the second device, the information item obtained is transmitted to the second device while the second device is performing sound output, to cause the second device to interrupt the sound output and output, by sound, the information item obtained.

8. The control method according to claim 1,
wherein when a plurality of second devices each of which is the second device are caused to output the information item obtained to a user by sound, a determination is made as to whether each of the plurality of second devices is in an output state, and
after a determination that each of the plurality of second devices is not in the output state, the information item obtained is transmitted simultaneously to the plurality of second devices to cause the plurality of second devices to simultaneously output, by sound, the information item obtained.

9. The control method according to claim 1,
wherein when the second device is caused to output the information item obtained to a plurality of users by sound,
(a) the information item obtained is transmitted to the second device a total number of times equal to a total number of the plurality of users to cause the second device to output the information item by sound the total number of times equal to the total number of the plurality of users, or
(b) the information item obtained is transmitted to the second device one time to cause the second device to output the information item by sound one time.

10. A controller comprising:
an obtainment unit that obtains an information item on operation of a first device from the first device;
a memory unit (a) that determines, according to content or an attribute of the information item obtained, a priority level for the information item obtained and (h) in which the information item obtained is stored in association with the priority level determined; and
an output control unit that preferentially transmits an information item associated with a higher priority level among information items stored in the memory unit to a second device to cause the second device to output the information item associated with the higher priority level by sound, the information items having been obtained by the obtainment unit, wherein:
the memory unit determines the priority level by referring to predetermined correspondence information in which the content or the attribute of the information item obtained is associated with a priority level to be assigned to the information item obtained, the priority level associated with the information item obtained in the predetermined correspondence information is determined as a priority level for the information item obtained,
the correspondence information is correspondence information held by a control device that is performing the control method, and
the memory unit determines the priority level for the information item obtained, by comparing the information item obtained and the correspondence information when the control device obtains the information item.

11. A non-transitory computer-readable recording medium having recorded thereon a program for causing a computer to execute the control method according to claim 1.

* * * * *